United States Patent
Fdida et al.

(10) Patent No.: US 7,522,530 B2
(45) Date of Patent: Apr. 21, 2009

(54) METHOD FOR PROTOCOL RECOGNITION AND ANALYSIS IN DATA NETWORKS

(75) Inventors: Serge Fdida, Afortville (FR); Gautier Harmel, St. Jacques (FR); Eric Horlait, Amiens (FR); Guy Pujolle, Chatillon (FR); Jerome Tollet, Saintonge (FR)

(73) Assignee: QOSMOS, Amiens (FR)

( * ) Notice: Subject to any disclaimer, the term of this patent is extended or adjusted under 35 U.S.C. 154(b) by 418 days.

(21) Appl. No.: 10/523,339

(22) PCT Filed: Jul. 4, 2003

(86) PCT No.: PCT/FR03/02075

§ 371 (c)(1),
(2), (4) Date: Sep. 1, 2005

(87) PCT Pub. No.: WO2004/017595

PCT Pub. Date: Feb. 26, 2004

(65) Prior Publication Data

US 2006/0106583 A1  May 18, 2006

(30) Foreign Application Priority Data

Jul. 29, 2002 (FR) .................................. 02 09599

(51) Int. Cl.
 *H04L 12/26* (2006.01)
(52) U.S. Cl. ........................ 370/241; 370/465; 709/224; 714/39
(58) Field of Classification Search ................ 370/241, 370/465, 469; 714/37, 38, 39; 709/223, 709/224
See application file for complete search history.

(56) References Cited

U.S. PATENT DOCUMENTS

| | | | | |
|---|---|---|---|---|
| 5,793,954 | A | 8/1998 | Baker et al. | ............... 395/200.8 |
| 5,802,065 | A | 9/1998 | Ogawa et al. | ................ 370/469 |
| 6,401,117 | B1 * | 6/2002 | Narad et al. | ................. 709/223 |
| 6,831,913 | B1 * | 12/2004 | Vialen | .......................... 370/349 |
| 2002/0176365 | A1 * | 11/2002 | Lund | .......................... 370/244 |
| 2003/0223364 | A1 * | 12/2003 | Yu et al. | ................... 370/230.1 |

FOREIGN PATENT DOCUMENTS

| | | |
|---|---|---|
| WO | WO 01/01272 A2 | 1/2001 |
| WO | WO 01/22686 A1 | 3/2001 |

* cited by examiner

*Primary Examiner*—Min Jung
(74) *Attorney, Agent, or Firm*—Occhiuti Rohlicek & Tsao LLP (57) ABSTRACT

A method for protocol identification by recognizing determinative data among data transmitted through a detected connection using lists of explicit and implicit son protocols associated with each protocol. The kernel of an information system associates to each detected connection a data structure arranged so that it comprises an ordered sequence of the protocol names. The kernel builds the data structure by retrieving the son protocol names in the list associated to the last protocol name of said ordered sequence, the son protocol name for which the associated self identification mechanism recognizes determinant data among transmitted data by adding the retrieved son protocol name to the end of the sequence and by restarting to retrieve the son protocol name for which the associated self identification mechanism recognizes determinant data among transmitted data.

11 Claims, 3 Drawing Sheets

FIG.1.

| 001 | Base | root | | 002 | 003 | 004 | | | |
|---|---|---|---|---|---|---|---|---|---|
| 002 | Ethernet | explicit | | 005 | 007 | 008 | | | |
| 003 | ATM | explicit | | 005 | 007 | 008 | | | |
| 004 | PPP | explicit | | 008 | | | | | |
| 005 | LLC | explicit | | 006 | 008 | | | | |
| 006 | STP | explicit | | | | | | | |
| 007 | IPv6 | explicit | | 007 | 008 | 009 | 010 | 011 | |
| 008 | IPv4 | explicit | | 008 | 010 | | | | |
| 009 | TCP | implicit | | 012 | 013 | 014 | 015 | 016 | 019 |
| 010 | UDP | implicit | | 015 | 016 | 017 | | | |
| 011 | ICMP | explicit | | | | | | | |
| 012 | FTP | explicit | dynamic | | | | | | |
| 013 | HTTP | implicit | dynamic | 018 | 019 | 014 | | | |
| 014 | Telnet | explicit | | | | | | | |
| 015 | DNS | explicit | | | | | | | |
| 016 | RPC | implicit | | 020 | 021 | | | | |
| 017 | RTP | implicit | | | | | | | |
| 018 | Pointcast | implicit | | | | | | | |
| 019 | Kazaa | implicit | dynamic | | | | | | |
| 020 | NIS | implicit | | | | | | | |
| 021 | NFS | implicit | | | | | | | |

METHOD FOR PROTOCOL RECOGNITION AND ANALYSIS IN DATA NETWORKS

CROSS-REFERENCE TO RELATED APPLICATIONS

This application is the National Stage of International Application No. PCT/FR03/002075, filed Jul. 4, 2003, which claims the benefit of French Patent Application Serial No. 02/09,599, filed on Jul. 29, 2002. The contents of both applications are hereby incorporated by reference in their entireties.

FIELD OF THE INVENTION

The field of the invention is that of the control of data networks.

BACKGROUND OF THE INVENTION

Classification of traffic traveling around a data network makes it possible to decide on behaviors to be adopted for each traffic flow as a function of its classification.

For example in a firewall, a security system setup generally relies on recognition of protocol properties so as to prevent certain transfers.

Again for example, equipment for managing quality of service, allocate priorities to data as a function of complex rules which describe scenarios. A correspondence between these scenarios and data packets conveyed within connections uses techniques for classifying these connections.

Again for example, network monitoring equipment produce statistics for measuring and controlling the state of the network at a particular point. This requires a classification and recognition of the various streams which flow through this point.

Again for example, classification of various streams is useful for billing services, since the costs vary depending on whether these services are of audio, video, electronic messaging or database enquiry type. Moreover, it is often essential to correctly identify users of these services in order to guarantee the billing thereof.

The operations for controlling and managing networks thus require classification of connections between various senders and receivers which generate digital data streams over these networks. This requires powerful and reliable methods of classification.

According to the known state of the art, a data packet observation task is assigned to a node of the network such as for example a proxy server through which there pass connections which generate these data packets.

Patent application WO 0101272 discloses a procedure and an apparatus for monitoring traffic in a network. Pattern recognition techniques (also known as pattern matching) applied to predetermined fields of analyzed data packets make it possible to identify a protocol which follows a protocol previously identified in a connection protocol stack, on condition that the protocol previously identified makes it possible to determine the fields and the patterns or values to be recognized therein to identify the following protocol or protocols.

Among such explicit protocols is found the Ethernet protocol for which the packet header specifies whether the following protocol in the protocol stack is for example the LLC protocol or the IP protocol possibly together with its version. Likewise the packet header under IP protocol specifies whether the following protocol in the protocol stack is for example the TCP, UDP or ICMP protocol.

A problem which arises is that of the recognition of implicit protocols. A protocol is said to be implicit when it is not explicitly identifiable in a definite manner by a protocol header which precedes it in the protocol stack. Such is the case for numerous application-level protocols such as Pointcast or Kazaa, use of which in the protocol stack of a connection depends on the connection's context generally established by prior negotiations, that are difficult to compile with real-time scanning along with the flow, of the packets traveling around the connection.

Certain known protocols such as the HTTP, Telnet, FTP protocols are today at the limit of explicit and implicit protocols. These protocols may be regarded as explicit when a reserved port number figuring in a TCP protocol header gives a destination indicator which makes it possible to identify in a definite manner the protocol which is transported, for example a number 80 corresponding to the HTTP protocol, a number 23 corresponding to the Telnet protocol, a number 21 corresponding to the FTP protocol. A client station uses for example under TCP, the port number 80 to establish an HTTP enquiry connection with a server station by allotting a dynamic port number to a peer connection which allows the server station to respond to the client station. It will be remarked here that the explicit nature of the HTTP protocol over the peer connection for conveying the responses of the server station to the client station, is lessened through the dynamic allocation of a port number, related to the context of the enquiry connection. Moreover, today nothing prevents a client station from negotiating beforehand with the server station, a port number distinct from the number 80 for the HTTP enquiry connection. In this case, the HTTP protocol is more implicit than explicit. This remains true for other protocols. Moreover, an enquiry connection under the FTP protocol engenders in a known manner other dynamic connections for the actual transfer of the files, the enquiry connection and its peer connection being used for the transfers of control. Within the dynamic connection or connections engendered, the port numbers do not make it possible to explicitly recognize the FTP protocol. An application of filters to the field of the port number under TCP, does not make it possible to identify the protocol transported in a definite manner.

Another problem which arises is that of the recognition of protocols whose implementation varies both through the architecture of their use and through the incessant creation of new protocols.

For example a conventional architecture is known for using the Telnet protocol by stacking the ordered sequence of protocols Ethernet, IP, TCP, Telnet. Other architectures are possible by stacking the ordered sequence of protocols Ethernet, IP, TCP, HTTP, Telnet or again Ethernet, IP, IP, TCP, HTTP, Telnet to manage roaming.

The systems of the prior art find it hard to accommodate protocol modifications of architecture by modifying dependency links between existing or new protocols when these systems are based on recognition of patterns in fields determined by these dependency links to identify protocols used. This drawback is particularly apparent in hardware systems for which any confrontation with connections established according to nonscheduled protocol architecture requires a reconstruction for the sake of efficiency.

BRIEF SUMMARY OF THE INVENTION

A subject of the invention is a method for classifying by means of a computing system, connections detected between senders and receivers in communication networks which use protocols, each named by a usable protocol name. The method is noteworthy in that in the computing system:

associated with each usable protocol name is a protocol selfidentifier mechanism devised so as to recognize determinant information of the protocol named by this name, from among information conveyed in a detected connection, associated with each so-called father protocol usable protocol name is a non empty or empty list of so-called son protocol usable protocol names, with each connection detected, a computing kernel associates a first data structure devised so as to contain an ordered sequence of used protocol names which is initialized with a so-called base protocol name, for each connection detected, the computing kernel constructs the first data structure by searching through the list of son protocol names, associated with the last name of said ordered sequence, for a son protocol name for which the associated selfidentifier mechanism recognizes determinant information from among the information conveyed and then by appending to the end of the ordered sequence, the son protocol name when it is found and by starting to search again so long as it is possible to find in the list of son protocol names, associated with the last name of said ordered sequence, a son protocol name for which the associated selfidentifier mechanism recognizes determinant information from among the information conveyed, the computing kernel declares classified the connection detected when it is no longer possible to find in the list of son protocol names, associated with the last name of said ordered sequence, a son protocol name for which the associated selfidentifier mechanism recognizes determinant information from among the information conveyed.

The selfidentifier mechanisms associated with the usable protocol names and the usable protocol lists each associated with a usable protocol offers a modularity which makes it possible to adapt the method to any modification of architecture. When there exists an architecture creating a new possible dependency link between father protocol and son protocol, it is sufficient to append the son protocol name to the list associated with the father protocol name. When there exists a new usable protocol, it is sufficient to append to the system, a new selfidentifier mechanism associated with the name of the new usable protocol. A classification of connection may then be effected by progressive construction of an ordered sequence of used protocols, at each step of which the last protocol constitutes a father protocol. The classification is terminated when it is no longer possible to find a used son protocol for a father protocol which is the last of the protocols of the ordered sequence.

Advantageously to search for a son protocol name, the nature of which is implicit, the computing kernel submits the information conveyed, to each selfidentifier mechanism associated with a name from the list of son protocol names until one of the selfidentifier mechanisms declares recognition of determinant information or until no selfidentifier mechanism can declare recognition of determinant information.

Furnished with the rules of language of the son protocol with which it is associated, the selfidentifier mechanism can easily verify whether the information submitted belongs to this language.

Advantageously also to search for a son protocol name, the nature of which is explicit, the computing kernel submits the information conveyed to the selfidentifier mechanism associated with the last name of said ordered sequence, in such a way that this selfidentifier mechanism finds the name of the son protocol among the determinant information of the father protocol.

Furnished with the rules of language of the father protocol with which it is associated, the selfidentifier mechanism can easily find from among the information submitted, that which specifies the son protocol.

When the ordered sequence is completed up to the application level, the connection with which it is associated is classified by type of application level. This allows for example a firewall to block any connection of file transfer type or allows a network manager to measure a volume of connections of web based browser type (WWW standing for World Wide Web).

In a particular manner, the computing kernel formulates a current signature for each connection detected, by submitting all or part of the information conveyed to at least one selfidentifier mechanism associated with one of the names of low rank in said ordered sequence, in such a way that this selfidentifier mechanism finds among the determinant information, source and destination indicators incorporated into said current signature by the computing kernel.

In the ordered sequence which constitutes a protocol stack image, the low ranks correspond generally to the physical, network and transport level layers. The signature makes it possible to distinguish each connection. Such a distinction among connections of one and the same application type allows for example a firewall to block any connection of file transfer type from or to a particular piece of computing equipment. This again allows for example a network manager to measure a volume of connections of web based browser type initiated by client equipment or destined for a particular piece of server equipment.

More particularly, the computing kernel catalogs each first data structure in a first table by establishing a first associative correspondence between each first data structure and the current signature formulated for the associated connection.

The additional technical effect afforded by the signature is then that of allowing the computing kernel to refer to one and the same connection during the construction of the data structure when the information conveyed is disparate without being grouped together by an accessory mechanism.

Distinct connections may in fact belong to one and the same semantic flow. Such is the case for example for peer connections and or dynamic connections.

In a particularly advantageous manner, the computing kernel establishes in said first table a second associative correspondence between each current signature and a peer signature whose source indicators are the indicators of destination of the current signature and whose destination indicators are the indicators of source of the current signature.

In a particularly advantageous manner also:

the computing kernel traverses the used protocol names of the ordered sequence in the data structure which it constructs so as to detect each dynamic connection protocol name, for each dynamic connection protocol name detected, the computing kernel submits the information conveyed to the selfidentifier mechanism associated with the name detected in such a way as to determine whether there exists a subsequent dynamic connection and if a subsequent connection exists, to associate therewith a second data structure devised so as to contain an ordered sequence of potential protocol names which begins with the so-called base protocol name.

The second associative correspondence and or the second data structure make it possible to advise connections of one and the same semantic flow even before detecting them and then to complete the classification of several connections of one and the same semantic flow on the basis of the information conveyed in one of the detected connections of this same semantic flow.

In a more particularly advantageous manner, the computing kernel catalogs each second data structure in a second table by establishing an associative correspondence between each second data structure and a potential signature formulated by the selfidentifier mechanism associated with the name detected.

In a more particularly advantageous manner still, the computing kernel furthermore constructs the first data structure:
 by searching for the ordered sequences of potential protocol names in which the ordered sequence of used protocol names is included and,
 when there exists an ordered sequence of potential protocol names whose potential signature corresponds to the current signature, by completing the first data structure by means of the second data structure.

In order to be executed in real time so as to allow better reactivity of other systems which use the classifications produced and or to reduce a necessary volume of memory resources of the computing system which executes the method, the method for classifying connections is improved in that:
 the computing kernel gathers in data packets passing through the computing system within connections to be detected, the useful information conveyed so as to formulate a signature in such a way as to formulate the current signature whenever the useful information conveyed is sufficient,
 the computing kernel uses the current signature thus formulated in real time to detect a connection, in such a way as to search in said first table, for the first data structure which corresponds to the current signature, to associate a new first data structure with the connection detected when there exists no first data structure which corresponds to the current signature and to start or continue to construct the first data structure when there exists a first data structure which corresponds to the current signature, by gathering in the data packets, the useful information conveyed so as to construct first data structure.

Should packets of large size be fragmented into packets of smaller size, it may happen that the useful information gathered in a data packet is not sufficient to formulate a signature.

According to an additional improvement of the method, the computing kernel catalogs the useful information in a second table by establishing an associative correspondence between the useful information which then comprises links of membership to one and the same connection, until the useful information is sufficient to formulate the current signature.

DETAILED DESCRIPTION OF THE INVENTION

Figure 1:
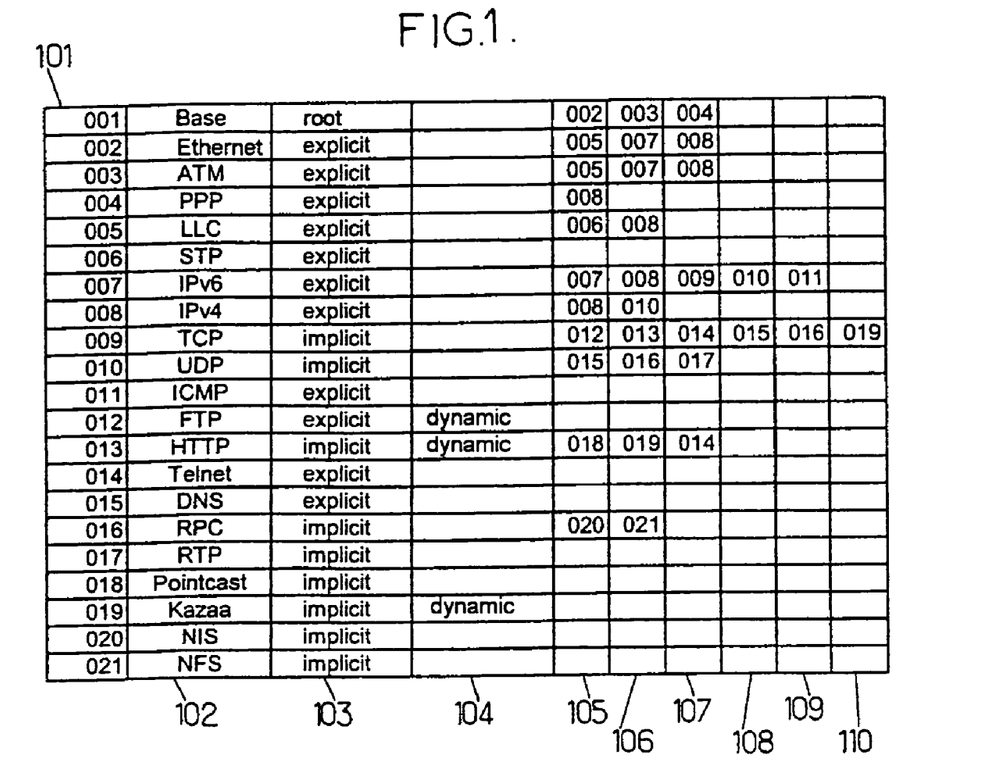
FIG. 1 shows a possible representation in memory of a protocol graph.

With reference to FIG. 1, an array 101 contains in a column 102 a usable protocol name in each row labeled 001 to 021 without the number of rows being limiting. In the corresponding row, a list is associated with each usable protocol name of the column 102, thus said to be the father protocol. In columns 105 to 110 without the number of columns being limiting, each list is established here by pointers to rows of the array whose protocol name figuring in column 102 is thus said to be a son protocol.

For example the row labeled 001 contains the name Base which identifies a so-called base protocol which by exception, is not actually a protocol usable by the connections but rather a root protocol usable to commence a protocol graph traversal consisting of a gradual concatenation of all the lists of son protocols. The list, associated with the name Base, of son protocol names here contains the protocol names Ethernet, ATM, PPP which are physical-layer protocols, the first ones to be actually usable for connections. Thus, the pointer in column 105 points to row 002, the pointer in column 106 points to row 003, the pointer in column 107 points to row 004.

In row labeled 002, the list, associated with the name Ethernet, of son protocol names contains the names of protocols LLC, Ipv6, Ipv4 each pointed at respectively in row 005, 007, 008 by the pointers situated respectively in column 105, 106, 107.

In row labeled 005, the list, associated with the name LLC, of son protocol names, contains the names of protocols STP, Ipv4 each pointed at respectively in row 006, 008, by the pointers situated respectively in column 105, 106.

In row labeled 006, the list, associated with the name STP, of son protocol names is empty. The protocol name STP is on a leaf of the protocol graph, that is to say there exists no son protocol for this father protocol.

In row labeled 007, the list, associated with the name Ipv6, of son protocol names contains the names of protocols Ipv6, Ipv4, TCP, UDP and ICMP each pointed at respectively in row 007, 008, 009, 010, 011 by the pointers situated respectively in column 105, 106, 107, 108, 109. It is remarked that the name Ipv6 is both the name of a father protocol and the name of a son protocol. This manifests a possibility of placing a network layer above a network layer of identical protocol to manage roaming in a known manner by creating a network tunnel. A network layer of different protocol can also be placed above a network layer to manage differences in compatibility between networks, for example a compatible Ipv4 network over which Ipv6 connections are made to pass.

Column 103 contains for each protocol name an indicator which indicates whether the protocol is explicit or implicit, that is to say whether the protocol in time as son protocol is specified by the father protocol or not. By exception, the indicator in row 103 indicates that the protocol named Base is of root type since it has no father protocol.

Column 104 contains for each protocol name another indicator which indicates whether the protocol is able to generate dynamic connections. Such is the case for example for the FTP protocol in row 012 or for the http protocol in row 013.

With each usable protocol name figuring in column 102 is associated a selfidentifier mechanism. Each selfidentifier mechanism is devised to be activated by a computing kernel by means of the protocol name with which it is associated. Each selfidentifier mechanism comprises filters which in a preferred manner are devised in the form of rules complying with the language of the protocol with the name of which the selfidentifier mechanism is associated. By means of an inference engine, the selfidentifier mechanism is devised to retrieve from a packet of data which are submitted to it by the computing kernel, those which satisfy rules for responding to a request from the computing kernel. In a known manner, a rule comprises a premise part and an action part which generates a response when the rule is activated and when the premise part is satisfied. The inference engine of the selfidentifier mechanism is devised to progressively satisfy a rule premise in tandem with successive submissions of data packets by the computing kernel, in such a way that the action part can generate with each submission, a response of negative, probable or positive type according respectively to the non-satisfaction or the partial or total satisfaction of the premise part.

Figure 2:
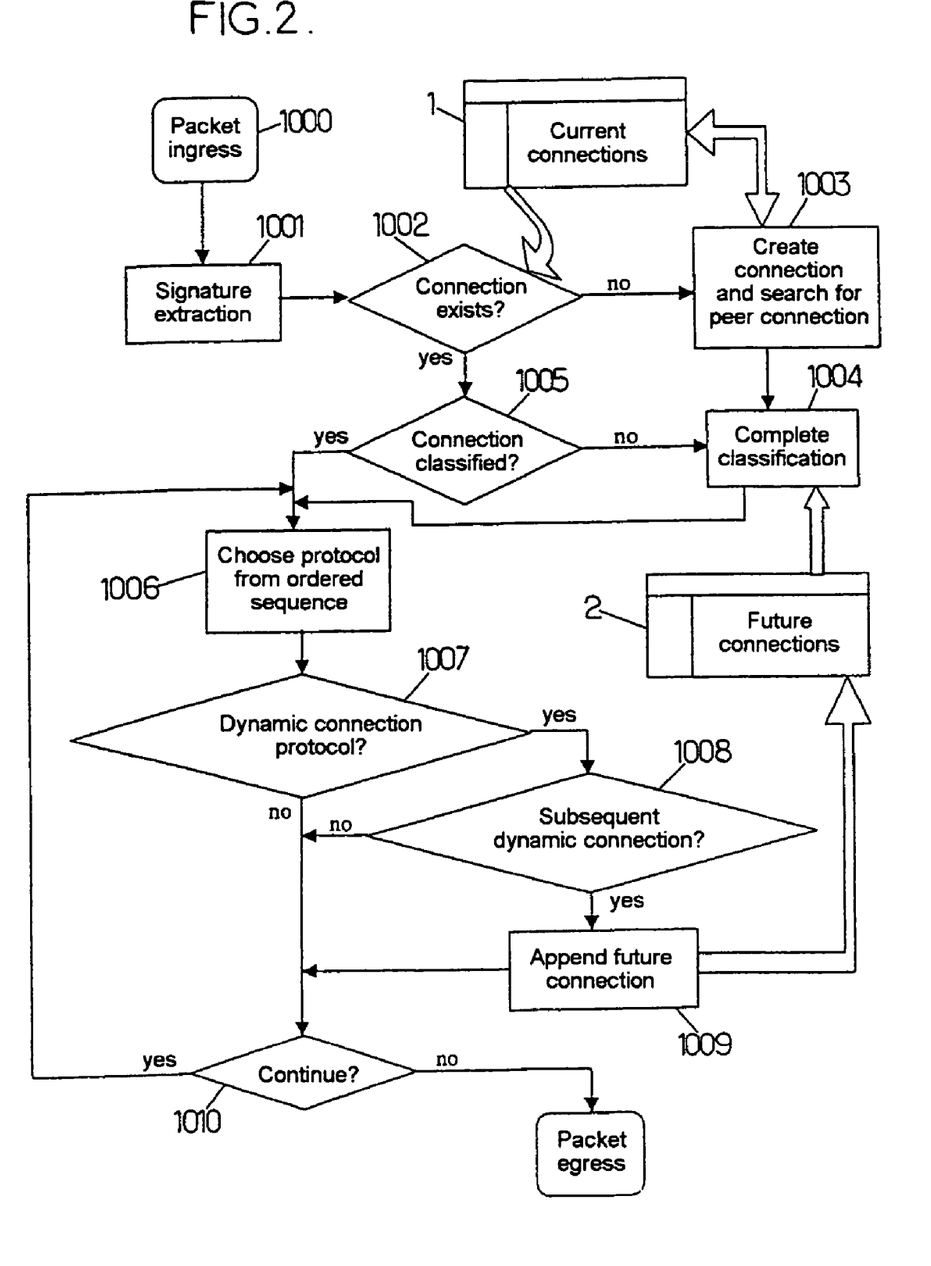
FIGS. 2 and 3 are flowcharts of the method in accordance with the invention.

With reference to FIG. 2, the method is activated in a step 1000 for each data packet that the computing system diverts from the network at the physical level. At the physical level, all the connections to be detected pass physically through a coupler of the computing system for example of Ethernet type (IEEE 802 standards), of ATM type (Asynchronous Transfer Mode), of PPP type (Point to Point Protocol) or of any other type of physical level. At this level, the computing system is furnished with a string of bits which physically constitutes the packet.

In a step 1001, the computing kernel extracts a signature from the packet by submitting the content of the packet to a selfidentifier mechanism associated with the protocol used by the physical coupler which receives the packet. The computing kernel requests the selfidentifier mechanism to return it a source indicator, a destination indicator and a transported protocol name. The selfidentifier mechanism is furnished with filters devised to recognize in the packet the source and destination indicators, for example MAC addresses in the case of an Ethernet type physical coupler, virtual circuit identifiers (VCI) and virtual path identifiers (VPI) in the case of an ATM type physical coupler, calling and called telephone numbers in the case of a PPP type physical coupler. It will be noted that at the physical level, the destination indicator is that which corresponds to the physical address of the coupler of the computing system. A physical layer protocol generally being of explicit nature, the selfidentifier mechanism is also furnished with filters devised to recognize the protocol transported.

Receiving the source and destination indicators from the selfidentifier mechanism, the computing kernel generates a physical level signature which contains the source identifier and destination identifier.

By means of the transported protocol name which is returned by the physical level selfidentifier mechanism, the computing kernel submits the data of the packet to the associated selfidentifier mechanism and requests it to return it a source indicator, a destination indicator and if possible a transported protocol name. The selfidentifier mechanism is furnished with filters devised to recognize in the packet the source and destination indicators, for example IP addresses in the case of the IP protocol. A network layer protocol generally being of explicit nature, the selfidentifier mechanism is also furnished with filters devised to recognize the protocol transported.

Receiving the source and destination indicators from the selfidentifier mechanism, the computing kernel generates a network level signature which contains the source identifier and destination identifier.

By means of the transported protocol name which is returned by the network level selfidentifier mechanism, the computing network submits the data of the packet to the associated selfidentifier mechanism so as to generate as previously, a signature of corresponding level and to repeat the operations described previously until a selfidentifier mechanism signals that it cannot give any transported protocol name.

The computing kernel concatenates the signatures generated for each level so as to obtain a global signature which is specific to a connection within which the packet is conveyed.

Certain protocols implement fragmentation, that is to say divide a packet into several packets of size compatible with the lower-layer protocols. It is for example the case that a protocol of higher level manipulates packets of greater size than the maximum size of the data that can be contained in a physical frame (MTU standing for Maximum Transfer Unit). It is recalled that in the fragments of one and the same packet, the original header is not reproduced in full on all the fragments. Thus, when a packet which turns up constitutes in fact only a fragment of a packet, it does not necessarily contain all the information making it possible to generate the signature specific to a connection. For example in the case of the UDP over IP protocol, a UDP fragment may turn up without containing the UDP header, in particular the source and destination ports which allow a signature calculation.

Each selfidentifier mechanism associated with a protocol name able to implement fragmentation, is furnished with at least one filter devised so as to recognize an indication of complete-packet size greater than a current-packet size and or to recognize a complete-packet restitution identifier. The restitution identifier is generally a serial number allocated by the source to each packet fragment. The selfidentifier mechanism then signals the fragmentation to the computing kernel and the restitution identifier. The computing kernel uses an associative table which matches each signature calculatable up to fragmentation level with the global signature for the complete packet. Thus, when a packet or packet fragment which satisfies the conditions of the associative table turns up, the computing kernel associates the corresponding global signature directly with this packet or packet fragment.

In this implementation of the method, the computing kernel thereafter uses the signature extracted in step 1001 to construct a first data structure for the connection detected by the packet entry in step 1000.

In a step 1002, the computing kernel searches through an associative table 1 for the current connections if there exists a correspondence with the global signature extracted in step 1001. To aid the search, the computing kernel applies a hash function to the global signature to calculate a hash key which in a one-to-one manner references a row of the associative table 1 in a known manner by means of a hash table.

If the computing kernel finds a correspondence in the associative table 1, it activates a step 1005, otherwise it activates a step 1003. Thus, the computing kernel verifies in step 1002 whether the packet whose signature is extracted belongs to an existing connection already catalogued in the associative table of current connections.

In step 1003, the computing kernel creates a row in the associative table 1 by establishing a correspondence of the connection detected with the global signature extracted in step 1001. For the connection detected, the computing kernel initializes in the row created, the first data structure with an ordered sequence of used protocol names which starts with the protocol named Base. The first data structure also comprises a string of binary variables each allocated to a column of array 101 onwards of column 105. To initialize this string of binary variables, the computing kernel reads each cell of the array 101 which lies at the intersection of a column onwards of column 105 and of the row of the array 101 which contains in column 102 the last protocol name of the ordered sequence. For a non-empty cell, the computing kernel sets the binary variable of corresponding rank to 1 to indicate a non-zero probability of use of protocol name referenced by this cell. For an empty cell, the computing kernel sets the binary variable of corresponding rank to zero to indicate a zero probability of use of protocol name referenced by this cell. Simultaneously, the computing kernel calculates a peer connection signature so that each indicator of source of the peer connection signature is the destination indicator of corresponding level which figures in the global signature and in such a way that each indicator of destination of the peer connection signature is the source indicator of corresponding level which figures in the global signature. The computing kernel thereafter searches through the associative table 1 to find whether there exists a correspondence with the peer connection signature.

If the computing kernel finds in the associative table 1 a correspondence with the peer connection signature, it establishes a cross reference between the row which contains a correspondence with the current global signature and the row which contains a correspondence with the peer connection signature. If the computing kernel does not find in the associative table 1 a correspondence with the peer connection signature, it creates a row in the associative table 1 by establishing a peer connection correspondence with the peer connection signature and then the computing kernel establishes a cross reference between the row which contains the correspondence with the current global signature and the row which contains the correspondence with the peer connection signature.

Following step 1003, the computing kernel activates a step 1004.

In step 1005, the computing kernel looks in the row of the associative table 1 which contains a detected connection correspondence with the global signature, to see whether the connection is marked with a classified state.

If the connection detected is marked with a classified state, the computing kernel activates a step 1006, otherwise, the computing kernel activates step 1004.

Figure 3:
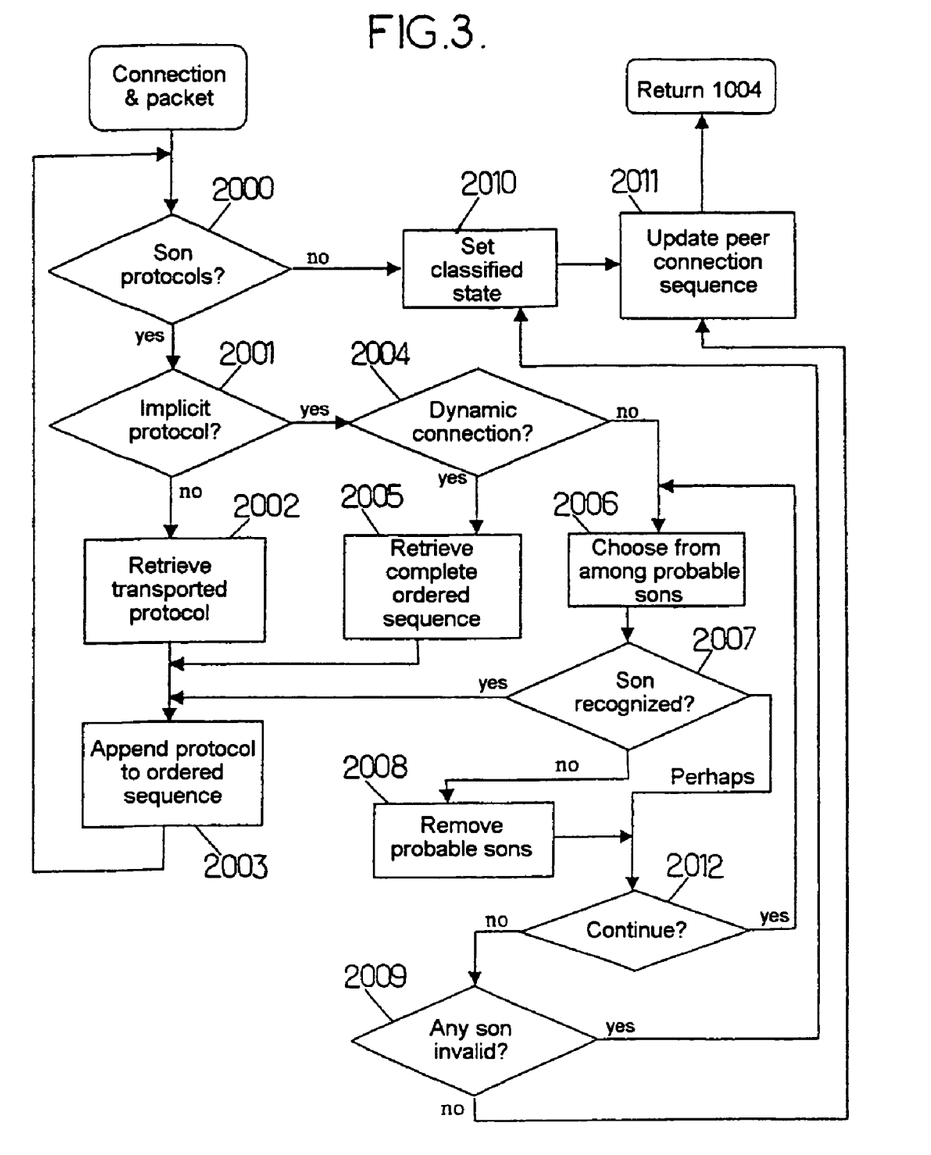

In step 1004, the computing kernel continues to construct the first data structure by executing the steps now described with reference to FIG. 3.

In a step 2000, the computing kernel points on the one hand to the row of the associative table 1 which has been found in step 1002 or created in step 1003 and on the other hand to the packet received in step 1000. The computing kernel reads as father protocol name, the used protocol name which is located at the end of the ordered sequence of used protocols of the row pointed at.

The computing kernel searches through the first data structure to find whether the string of binary variables contains a binary variable of non-zero value. If all the binary variables are zero, the computing kernel activates a step 2010. If there exists at least one non-zero binary variable, the computing kernel activates a step 2001.

In step 2001, the computing kernel looks through column 103 of the array 101 to see whether the father protocol is of implicit type. If the father protocol is of implicit type, the computing kernel activates a step 2004. Otherwise, that is to say if the father protocol is of explicit type, the computing kernel activates a step 2002.

In step 2002, the computing kernel transmits the content of the packet to the selfidentifier mechanism associated with the father protocol name and requests the selfidentifier mechanism to return it the son protocol name. The selfidentifier mechanism of the father protocol applies to the data contained in the packet submitted, the rules of recognition of the son protocol and returns to the computing kernel, a response containing the son protocol name if the data are sufficient to satisfy all of the premises or returns a standby response awaiting complementary data if the data are insufficient to satisfy all of the premises.

On receipt of the response of the selfidentifier mechanism, the computing kernel terminates step 1004 if the response is of standby type awaiting complementary data. If the response contains the son protocol name, the computing kernel activates a step 2003.

In step 2003, the computing kernel appends the son protocol name to the ordered sequence of used protocol names and reactivates step 2000 for which the last son protocol name appended in step 2003 then constitutes a father protocol name. As described previously, the first data structure comprises a string of binary variables each allocated to a column of array 101 onwards of column 105. Before reactivating step 2000, the computing kernel reads each cell of the array 101 which is located at the intersection of a column onwards of column 105 and of the row of the array 101 which contains in column 102 the last protocol name of the ordered sequence. For a non-empty cell, the computing kernel sets the binary variable of corresponding rank to 1 to indicate a non-zero probability of use of protocol name referenced by this cell. For an empty cell, the computing kernel sets the binary variable of corresponding rank to 0 to indicate a zero probability of use of the protocol name referenced by this cell.

As described previously, step 2004 is activated if the father protocol is of implicit type, that is to say it does not identify in a definite manner the protocol transported. In step 2004, the computing kernel searches through a second associative table 2, to find whether there exists a correspondence between the current signature and a second ordered sequence of protocol names which contains the first ordered sequence of protocol names which is the sequence cataloged in the first associative table 1. If the computing kernel finds such a second ordered sequence in the table 2, it activates a step 2005. Otherwise, the computing kernel activates a step 2006.

In step 2005, the computing kernel retrieves from the second ordered sequence, the protocol name or names which follow the father protocol name while preserving the order thereof. The computing kernel thereafter deletes the second ordered sequence from the associative table 2 and then activates step 2003.

In step 2003, the computing kernel appends the son protocol name or the son protocol names to the first ordered sequence of used protocol names while preserving their order. Before reactivating step 2000, the computing kernel sets the variables of the string of binary variables for the last protocol name appended to the ordered sequence of used protocol names.

In step 2006, the computing kernel reads successively a non-zero variable of the string of binary variables from the first data structure, starting with the first non-zero binary variable. From the cell of the array 101 with a rank corresponding to the non-zero binary variable, the computing kernel deduces a so-called probable son protocol name. The computing kernel submits the data packet to the selfidentifier mechanism associated with the probable son protocol name while asking the selfidentifier mechanism whether the packet which is submitted to it allows it to identify in a definite manner that the son protocol is a used protocol. On receipt of the response from the selfidentifier mechanism, the computing kernel activates a step 2007.

In step 2007, the computing kernel activates step 2003 if the selfidentifier mechanism responds that the son protocol is used, the computing kernel activates a step 2008 if selfidentifier mechanism responds that the son protocol is not used, the computing kernel activates a step 2012 if selfidentifier mechanism responds that the son protocol is perhaps used.

In step 2008, the computing kernel sets the current binary variable to zero to indicate that the son protocol name is not that of a used protocol. The computing kernel thereafter activates step 2012.

In step 2012, the computing kernel looks through the string of binary variables to see whether there exists a non-zero binary variable after that which led to the previous activation of step 2006. If there exists a non-zero binary variable, the computing kernel activates step 2006 for the new non-zero binary variable detected in step 2012. If there exists no non-zero binary variable, the computing kernel activates a step 2009.

In step 2009, the computing kernel looks to see whether the string of binary variables contains only zero values. If the string of binary variables contains only zero values, the computing kernel activates step 2010. Otherwise, that is to say if the string of binary variables contains at least one non-zero value, the computing kernel activates a step 2011.

In step 2010, the computing kernel marks a classified-connection state in the first data structure and then activates step 2011.

In step 2011, the computing kernel updates the peer connection by completing the first data structure associated with the peer connection with the ordered sequence of used protocol names and the string of binary variables contained in the first data structure associated with the current connection. The computing kernel then terminates step 1004.

After step 1004, the computing kernel activates step 1006 now described with reference to FIG. 2.

In step 1006, the computing kernel considers successively a protocol name of the ordered sequence of used protocol names starting with the protocol name which follows the name Base. The computing kernel looks through column 104 to see whether the protocol name considered corresponds to a protocol that generates a dynamic connection. If the protocol name considered does not correspond to a protocol that generates a dynamic connection, the computing kernel activates a step 1010. If the protocol name considered corresponds to a protocol that generates a dynamic connection, the computing kernel activates a step 1008.

In step 1008, the computing kernel submits the data packet to the selfidentifier mechanism associated with the protocol name considered so as to ask the selfidentifier mechanism whether it detects that a dynamic connection is generated in the data packet submitted and if so to return the scheduled protocol names and the source and destination identifiers of the dynamic connection which is generated. If the selfidentifier mechanism returns scheduled protocol names and source and destination identifiers for a dynamic connection, the computing kernel activates a step 1009. Otherwise, that is to say if the selfidentifier mechanism responds that it detects no generation of dynamic connection, the computing kernel activates step 1010.

In step 1009, the computing kernel appends to the second associative table 2, a second data structure, associated with a future connection by using the first data structure associated with the current connection and by using the response returned by the selfidentifier mechanism in step 1008.

In step 1010, the computing kernel looks to see whether there exists a following protocol name in the ordered sequence of used protocol names. If there exists a following protocol name in the ordered sequence of used protocol names, the computing kernel reactivates step 1006 for this following protocol name. Otherwise, that is to say if there exists no following protocol name in the ordered sequence of used protocol names, the computing kernel ejects the packet received in step 1000 so that this packet continues its path as far as its following destination.

The method just described is repeated for each receipt of packet in step 1000.

The invention claimed is:

1. A method for classifying connections detected between senders and receivers belonging to a communication network, said senders and receivers using communication protocols, each communication protocol designated by a user protocol name, said method being performed and operated by means of a computing system, the method comprising:

recognizing determinant information on the protocol designated by said name, from among information conveyed in a detected connection, by a protocol self-identifier mechanism associated with each implicit and explicit used protocol name and devised to recognize said determinant information;

establishing a non-empty or empty list of potentially used protocol names referred to as a list of son protocol names, with said list of son protocol names being associated with one of each said used protocol names, the protocol name so associated with the list of son protocol names being referred to as father protocol name; and for each detected connection, by a computing kernel operated by said computing system; constructing and thus associating to each detected connection a first data structure devised so as to contain an ordered sequence of used protocol names which is initialized with a so-called base protocol name, said first data structure being devised by searching, throughout said list of son protocol names associated with the last name of said ordered sequence, discriminating between implicit and explicit son protocol name, for a son protocol name for which said associated self-identifier mechanism recognizes determinant information from among said conveyed information and then appending to the end of said ordered sequence said son protocol name when it is found and repeating the search again otherwise, so long as it is possible to find in said list of son protocol names which is associated with the last name of said ordered sequence, a son protocol name for which said associated self-identifier mechanism recognizes determinant information from among said conveyed information; and declaring said detected connection as being classified when it is no longer possible to find, in said list of son protocol names associated with the last name of said ordered sequence, a son protocol name for which said associated self-identifier mechanism recognizes determinant information from among said conveyed information.

2. The method of claim 1, wherein said searching for an implicit son protocol name includes submitting by means of said computing kernel said conveyed information to each self-identifier mechanism associated with a name from said list of son protocol names until one of said self-identifier mechanism declares recognition of determinant information or until no self-identifier mechanism can declare recognition of determinant information.

3. The method of claim 1, wherein said searching for an explicit son protocol name includes submitting by means of said computing kernel said conveyed information to the self-identifier mechanism associated with the last name of said ordered sequence, so as to allow said self-identifier mechanism to find said son protocol name among the determinant information of said father protocol.

4. The method of claim 1, including establishing a current signature for each detected connection by said computing kernel, by:

submitting all or part of said conveyed information to at least one self-identifier mechanism associated with one of the names of low rank in said ordered sequence;

finding among the determinant information source and destination indicators by using said self-identifier mechanism; and incorporating said source and destination indicators into said current signature.

5. The method of claim 4, including cataloguing each first data structure in a first table by said computing kernel by establishing a first associative correspondence between each first data structure and the current signature established for the associated connection.

6. The method of claim 5, further including establishing by said computing kernel in said first table a second associative correspondence between each current signature and a peer signature whose source indicators arc the indicators of destination of the current signature and whose destination indicators are the source indicators of the current signature.

7. The method of claim 5, further including, operated by said computing kernel the steps of:

gathering, from data packets passing through said computing system within connections to be detected, the determinant information conveyed so as to formulate a signature and thus the current signature whenever the useful information conveyed is sufficient;

using said current signature thus formulated in real time to detect a connection, by searching in said first table for the first data structure which corresponds to said current signature, associating a new first data structure with said detected connection when there exists no first data structure which corresponds to said current signature, starting or continuing to construct said first data structure when there exists a first data structure which corresponds to said current signature, and gathering from the data packets the useful information conveyed so as to construct said first data structure.

8. The method of claim 7, further including when the useful determinant information gathered from a data packet is not sufficient to formulate a signature, operated by said computing kernel the steps of:

cataloguing the determinant information in a second table by establishing an associative correspondence between the useful information which thus comprises links or memberships to one and the same connection, until said determinant information is sufficient to formulate said current signature.

9. The method of claim 1, further including operated by said computing kernel the steps of:

reading the used protocol names of said ordered sequence in the data structure the computing kernel is building up, so as to detect each dynamic connection protocol name; and, for each dynamic connection protocol name detected, submitting the information conveyed to the self-identifier mechanism associated with the name detected so as to determine whether there exists a subsequent dynamic connection; and, if a subsequent connection exists, associating therewith a second data structure devised so as to contain an ordered sequence of potential protocol names which begins with said so-called base protocol name.

10. The method of claim 9 further including, operated by said computing kernel, the steps of cataloguing each second data structure in a second table by establishing an associative correspondence between each second data structure and a potential signature formulated by said self-identifier mechanism associated with the name detected.

11. The method of claim 10, further including operated by said computing kernel the steps of:

searching for the ordered sequences of potential protocol names in which the ordered sequence of used protocol names is included; and, when there exists an ordered sequence of potential protocol names whose potential signature corresponds to said current signature;

completing said first data structure by means of said second data structure.

* * * * *